(12) United States Patent
Gronau et al.

(10) Patent No.: US 6,650,989 B2
(45) Date of Patent: Nov. 18, 2003

(54) SYSTEM FOR CONTROLLING AN ANTI-LOCK BRAKING SYSTEM FOR MOTOR VEHICLES HAVING ALL-WHEEL DRIVE

(75) Inventors: Ralph Gronau, Wetter (DE); Dieter Burkhard, Bingen-Büdesheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/182,972

(22) Filed: Aug. 2, 2002

(65) Prior Publication Data

US 2003/0018425 A1 Jan. 23, 2003

(30) Foreign Application Priority Data

Feb. 4, 2000 (DE) ......................................... 100 05 071
Jan. 25, 2001 (DE) ......................................... 100 03 467

(51) Int. Cl.[7] .............................................. G06F 17/00
(52) U.S. Cl. ........................ 701/81; 303/122; 180/197
(58) Field of Search ............................... 701/81, 78, 79, 701/70, 83; 303/122, 176, 183, 190; 180/197, 233

(56) References Cited

U.S. PATENT DOCUMENTS

| 4,729,608 A | * | 3/1988 | Fennel et al. ............... 303/190 |
| 5,105,903 A | * | 4/1992 | Buschmann ................ 180/249 |
| 5,221,127 A | * | 6/1993 | Ehmer et al. .......... 303/122.08 |
| 5,253,931 A | * | 10/1993 | Koster et al. ............... 303/176 |
| 5,797,664 A | | 8/1998 | Tagawa |

FOREIGN PATENT DOCUMENTS

| DE | 35 21 960 | 1/1987 |
| DE | 39 19 293 | 12/1989 |
| DE | 40 09 195 | 9/1991 |
| DE | 197 47 689 | 5/1999 |

* cited by examiner

Primary Examiner—William A. Cuchlinski, Jr.
Assistant Examiner—Olga Hernandez
(74) Attorney, Agent, or Firm—Rader, Fishman & Grauer PLLC

(57) ABSTRACT

A method for controlling an anti-lock braking system, intended for motor vehicles having all-wheel drive, electric signals representative of the rotational behavior of the vehicle wheels are produced and logically combined. When a locking tendency occurs, the braking pressure is controlled, and the instantaneous wheel slip, the wheel acceleration, and the wheel deceleration are evaluated as control criteria, and wherein the individual wheel speed is compared to a vehicle reference speed which is used as a reference quantity for controlling the braking pressure. In the event of a wheel rotational behavior that is typical of a spinning tendency and is revealed by a rise of the vehicle reference speed in excess of the actual vehicle speed, the control concept is modified up to a defined point of time in that the instantaneous wheel slip is left out of account as a control criterion for this spinning phase and the braking pressure control becomes dependent on merely the wheel acceleration or the wheel deceleration.

23 Claims, 3 Drawing Sheets

SYSTEM FOR CONTROLLING AN ANTI-LOCK BRAKING SYSTEM FOR MOTOR VEHICLES HAVING ALL-WHEEL DRIVE

TECHNICAL FIELD

The present invention generally relates to anti-lock brake systems and more particularly relates to anti-lock brake systems used in combination with all wheel drive systems

BACKGROUND OF THE INVENTION

A method of this type and a circuit arrangement of this general type are disclosed in DE 35 21 960 A1.

To control the wheel slip during a braking operation with an anti-lock, i.e., slip-controlled braking system, it is principally necessary to measure the speed and speed variations of the controlled wheels and to compare these values with an appropriate reference quantity. This reference quantity must show the varying braking pressure requirements (e.g. by means of an electronic regulation and control circuit) to prevent locking of the wheels and thereby maintain driving stability and steerability without increasing the stopping distance. In prior-art slip-controlled braked systems, the so-called vehicle reference speed is used as a reference quantity, in the ideal case reproducing the vehicle speed in consideration of the optimal wheel slip.

It is difficult during a braking operation to determine the actual vehicle speed and the vehicle reference speed from the rotational behavior of the individual wheels, because slip occurs on each wheel and because the road conditions, the instantaneous load on the individual wheels, variations due to cornering, etc., are included in the measurements. To minimize these difficulties, it has already been known in the art to establish the vehicle reference speed by means of an additional wheel that runs freely during the braking operation, or is temporarily not braked. Such measures have not proven expedient for different reasons.

In practice, the vehicle reference speed is commonly fixed by logically combining the rotational behavior of the individual wheels. In state-of-the-art circuits, this reference quantity will follow the instantaneously fastest or second fastest wheel, depending on the situation, while in addition a limitation to the deceleration or acceleration of the vehicle that is maximally possible for physical reasons is effected in the various situations.

In vehicles with only one driven axle, spinning of the driven wheels due to the engine's moment of inertia, with the engine running and the clutch engaged on a slippery roadway, or as a consequence of too high a drive force can be recognized relatively easily in most situations by a comparison with the rotational behavior of the non-driven wheels. In vehicles with all-wheel drive, to which the present invention is related, additional difficulties are encountered by the coupling of the wheels by way of the drive train. This is because on roadways with a low coefficient of friction, when the differences in the road torques at the individual wheels become smaller than the coupling torques of the wheels with respect to each other, a slowly increasing positive slip may develop synchronously on all wheels which cannot be distinguished from an acceleration of the vehicle on roads with a high coefficient of friction only from the measurement of the wheel rotational behavior and logical combining of the individual wheel information. In this case, the vehicle reference speed may rise far beyond the vehicle speed. If a braking operation was now initiated, the electronic unit would detect a great difference between the wheels, which in reality run stably with the vehicle, and the—excessive—vehicle reference speed and, consequently, would start a control operation, i.e., an operation to maintain the pressure constant, or even a pressure reduction. Spinning of all four wheels, thus, leads to a too high vehicle reference speed, with the result that even if the wheels run stably again subsequently, the braking pressure will be decreased too much as long as until the reference quantity has dropped to the vehicle speed again.

A wrong reference speed can have adverse effects also outside a braking operation; it may e.g. cause an unwanted valve actuation.

Therefore, it has been disclosed in DE 35 21 960 A1 mentioned hereinabove to recognize the spinning tendency by way of the rise of the vehicle reference speed, to change over to a second control concept when the spinning tendency is detected and predetermined start conditions are reached, and to maintain the second control concept until defined exit conditions are reached.

The prior art method is so designed that when great positive vehicle reference speed gradients prevail, a change-over to the second control concept is carried out wherein the instantaneous wheel slip stays out of account and only the wheel acceleration or wheel deceleration becomes decisive for the braking pressure control. The vehicle reference speed gradient of traction slip control systems may be very low in vehicles with all-wheel drive due to TSC control, but still range above the maximum that is allowed by the coefficient of friction.

BRIEF SUMMARY OF THE INVENTION

In view of the above, an object of the present invention is to overcome the described shortcomings of prior art circuit arrangements and to develop a method for controlling an anti-lock braking system which permits detecting spinning of the wheels under all conditions, even in an all-wheel drive, and preventing an undesirable braking pressure decrease due to such a situation.

It has been found that this object can be achieved by a generic method in that the detection, or starting, or maintaining of the modified control concept is evaluated in accordance with a TCS signal.

When establishing the criteria for the change-over into the second control concept as known so far, it has been a problem in some situations with all-wheel driven vehicles with traction slip control systems in the event that all wheels undergo traction slip control, to determine the minimum value of the rise of the vehicle reference speed and/or to maintain this minimum value during the predetermined minimum period which is necessary to reach the predetermined start conditions. For example, the controller, more precisely the logical operation, cannot determine the minimum value or maintain it over the minimum period because spinning of the wheels at a very low, homogeneous coefficient of friction induces an intervention of the traction slip control, with the result of an engine intervention so that the acceleration of the wheels and, thus, the rise of the vehicle reference speed is limited. In contrast thereto, the method of the present invention permits undoubtedly detecting the spinning tendency of the wheels in every situation—even during a traction slip control operation, and even in the event of a braking operation induced after this situation, the control will be activated or the braking pressure kept constant or reduced only if the respective wheel becomes indeed unstable and tends to lock. Full braking capacity of the vehicle with the inclusion of the anti-lock control that ensures steerability and driving stability will thus be maintained even after traction slip control operations. While maintaining the method described hereinabove, the method of the present invention considers in all situations the entry into TCS control in the form of a TCS signal or a TCS quantity, and in each of the phases of detecting, starting, and/or maintaining the second control concept, the TCS signal is taken into account alternatively or in addition to the known conditions until predetermined exit conditions prevail.

In a favorable embodiment of the method of the present invention, the control is determined by the modified control concept, if a braking pressure control operation takes place in this phase starting from the TCS control, until at least one vehicle wheel on the rear axle or front axle shows a stable rotational behavior for a predetermined minimum duration. If, however, no braking pressure control is executed in this phase, the modified control concept will be maintained until all wheels lie in a speed range and an acceleration range for a long duration. When all wheels (calibrated wheel speeds or non-calibrated wheel speeds) lie in these ranges, the wheel speeds have no or only a very low traction slip and, thus, can be taken into account for developing a vehicle reference speed that corresponds to the actual vehicle speed in approximation. Appropriately, the wheel speeds are in a range of 5%, preferably 3%, relative to each other for a duration of at least 150 msec, preferably at least 200 msec, and the filtered wheel accelerations lie in a range of ±0.6 g, preferably, ±0.3 g, for a duration of at least 150 msec, preferably at least 200 msec, wherein 'g' refers to the acceleration due to gravity. The modified control concept can be terminated when this condition prevails.

In another embodiment of the present invention, the variation of the vehicle reference speed, especially the rise, i.e., the differential quotient, of the vehicle reference speed in excess of a predetermined limit value is evaluated to detect a spinning tendency. The limit value of the gradient of the vehicle reference speed signaling a spinning tendency is herein fixed to a value in the range between 0.1 g and 0.3 g, 'g' referring to the acceleration due to gravity. This limit value, however, may also be varied in steps or continuously in dependence on the variation of the vehicle reference speed.

Further, a variant of the method of the present invention includes that the control concept will be modified only after one or more start conditions are fulfilled in the presence of a wheel rotational behavior that is typical of a spinning tendency. A rise of the vehicle reference speed in excess of a predetermined limit value which can be predefined in the range between 0.1 g and 0.5 g, and a continuation of this tendency for a predetermined minimum time of e.g. 40 to 200 msec, and an entry into the TCS engine control may be chosen as start conditions. An entry into the TCS engine control takes place when at least one wheel is above a variable control threshold that depends on conditions.

Preferably, only entry into the TCS engine control may be chosen as one single start condition if the entry into the TCS engine control lies before the minimum value of the rise of the vehicle reference speed is reached, or the minimum value does not last longer than the minimum time. A suitable start limit value into the TCS engine control lies in the range between 1 km/h and 2 km/h for at least one wheel.

It is arranged for in another embodiment of the present invention that after at least one vehicle wheel regains a stable rotational behavior, that means, after this wheel reaches the stable zone of the coefficient-of-friction/slip curve, this wheel will take over the lead in the vehicle reference speed. Depending on the construction of the vehicle, that wheel that becomes stable as first, or a determined wheel (rear wheel or front wheel), or the wheel of a determined wheel group (combination front wheel/rear wheel) will assume this task. Advantageously, it is possible to terminate the modified control concept in the event of a direct transition from a traction slip control operation into a braking pressure control operation (ABS control) by detecting a first stable phase at the rear axle or the second stable phase at the front axle. The termination of the second stable phase precludes that the modified control concept is terminated prematurely by a characteristic anti-phase swinging action of the wheels in the event of pressurization of spinning wheels.

It is favorable in many cases when, according to another embodiment of the present invention, after the change-over to the modified control concept and detection of a brake application (such a signal can be obtained e.g. by means of the brake light switch), the braking pressure reduction, when the control commences, is delayed by a predetermined period of time that depends on the wheel rotational behavior. Depending on the magnitude of the wheel deceleration determined at this time, pressure reduction will set in e.g. 5 msec to 70 msec later when the control commences. In many other cases, it is an advantage when, according to another embodiment of the present invention, the change-over to normal control is delayed after the conditions of exit from the modified control concept have been satisfied or determined. Taking the slip into account in the braking pressure control will then commence at a later point of time because seemingly stable wheel courses may also develop due to differential effects that shall not be taken into consideration. The deceleration is advantageously achieved by incrementing a value in an integrator, the magnitude and return gradient of which determines the time period by which the entry into the normal control is delayed. In addition, the retarded entry into the normal control may favorably be controlled in response to a variable control threshold which determines the exit from the modified control concept in dependence on a typical wheel behavior of the vehicle (depending on the inertia moments, etc.).

When a wheel rotational behavior typical of spinning is detected and the vehicle accelerates or the vehicle reference speed rises, and/or in the event of an entry into the TCS engine control directly following a controlled braking operation, a control cycle which is still lasting at this moment will be terminated prematurely in another embodiment of the method of the present invention.

Also described are circuit arrangements for implementing the method of the present invention wherein the steps of detecting, and/or starting, and/or maintaining the modified control concept according to a TCS signal are implemented.

Preferably, the conditions of exit from the second control concept in a phase where a braking pressure control takes place out of the TCS control are satisfied when at least one vehicle wheel at the rear axle and/or a vehicle wheel at the front axle shows a stable rotational behavior for a predetermined minimum duration.

Expediently, the conditions of exit from the second control concept in a phase of absence of braking pressure control are satisfied when all wheels lie in a speed range, maximally 5%, for a long duration, at least 150 msec, and/or an acceleration range, maximally ±0.6 g.

In a special embodiment, the circuit includes a digital counter serving as an inverse-coupled integrator which, as soon as the start conditions are satisfied, is set into operation and integrates the vehicle reference speed with a predetermined time constant, and when the conditions are satisfied, is set to a fixed value (vREMS), e.g. to 10 km/h, upon entry into the TCS engine control.

In the event of an exit from the TCS control in a phase of absence of braking pressure control, the conditions of an exit from the second control concept are satisfied when the TCS control reaches or falls below an exit limit value.

The integrator of the circuit of the present invention is advantageously set to zero during a control cycle as soon as a vehicle wheel shows a stable rotational behavior, and will be restarted as soon as the start conditions are complied with.

The circuit arrangement is favorably configured so that the integrator, which is set to zero during a control cycle due to a stable rotational behavior of a vehicle wheel, will be set into action instantaneously upon entry into the TCS engine control—irrespective of further start conditions, and will be set to a fixed value during the TCS control again and again (with each loop) as long as the exit criteria are not satisfied. Because the signal reverses with a defined gradient, the increment of this signal will ensure trailing of the modified control mode until an exit limit value is reached, or values fall below this exit limit value.

DETAILED DESCRIPTION OF THE PREFERRED EMBODIMENTS

Figure 1:
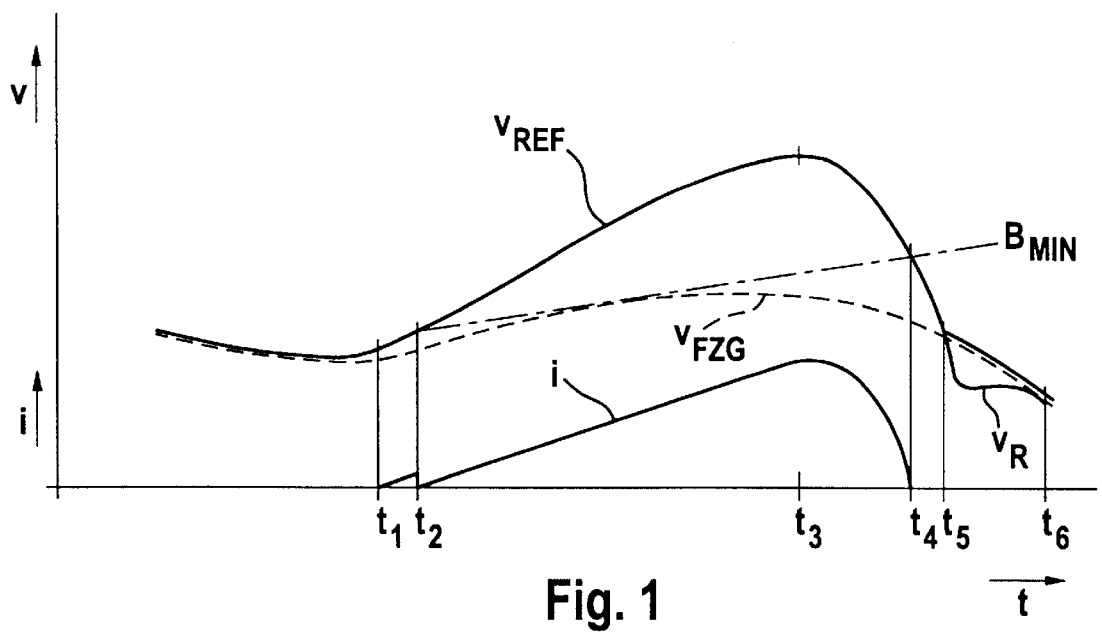
FIG. 1 is a diagram showing the time variation of the vehicle speed, the vehicle reference speed, the speed of a wheel, and the variation of a derived control quantity according to the method described in DE 35 21 960 A1.

The FIG. 1 embodiment shows in a simplified and idealized form the variation of the vehicle reference speed vREF in a situation where the method disclosed in DE 35 21 960 A1 is used. The speed vR of the vehicle wheel to which the diagram relates rises beyond the vehicle speed VFZG shown in dotted lines at time t1. The reference quantity vREF follows the wheel speed vR in the situation observed because e.g. in this situation all wheels synchronously adopt positive slip, thus, the speed of the wheels becomes higher than the vehicle speed. This is possible because all wheels are coupled to each other by way of the drive train and because the coefficient of friction between tires and road in this situation is so low that the differences in the road torque at the individual wheels are smaller than the coupling torques of the wheels with respect to each other.

The spinning control will not react to the spinning tendency until the time t2 because the start conditions will be satisfied only after expiry of the time period t1–t2. In the example described herein, the rise of the vehicle reference speed vREF must reach or exceed a limit value of 0.3 g for a period of time of 70 msec in order to trigger spinning control. The control concept is modified at the point of time t2. While in the 'normal case', that is as long as no tendency to spinning is detected, the braking pressure control of the anti-lock braking system depends on the instantaneous wheel slip as well as on the negative or positive acceleration, i.e., on the acceleration or deceleration, the brake slip control becomes independent of the instantaneous slip after the change-over at the point of time t2, as soon as the brake is actuated. In this situation, the braking pressure is determined exclusively by the deceleration and the acceleration of the respective wheel. This way, neutralization of the braking effect is prevented, that means, an excessive reduction of the braking pressure in consequence of the spinning wheel and the rise of the reference value vREF in excess of the actual vehicle speed vFZG that results from spinning. Locking of the wheels is likewise prevented because the modified control concept, i.e., the sole dependency of brake slip control on the positive or negative acceleration, applies until a specific point of time only.

In the embodiment of the method, to which FIG. 1 is referring, the variation of the vehicle reference speed vREF, in particular the rise of this reference quantity, is evaluated to detect a spinning tendency. The point of time for termination of the special control, namely, the spinning control, and for switching back to the normal control is determined with the aid of an inverse-coupled integrator, which can be achieved in a digital control circuit by a counter.

In this integration of the reference speed vREF, a predefined quality is taken into account as a time constant, which is approximated to the minimum acceleration to be reached by a vehicle even under very unfavorable conditions, i.e., on very slippery road surfaces. A straight line B min, illustrated in dash-dot lines, having a gradient that corresponds to this minimum acceleration represents this time constant. For example, a value in the range between 0.1 g and 0.3 g is selected for this gradient.

The straight line B Min intersects the reference speed vREF at the point of time t2, because change-over to the modified control concept takes place and integration commences at that time. The counter contents symbolizes the curve i. Beginning at the point of time t2, the counter contents grows corresponding to the rise of the reference speed vREF vis-à-vis the vehicle speed vFZG, drawn in dotted lines, or, respectively, vis-à-vis the straight line representative of the minimum acceleration B Min. As soon as the reference speed vREF re-approaches the vehicle speed, the spinning or, respectively, the positive slip becomes less, the integrator contents i will reduce to the same degree and become zero again at the point of time t4 at which the straight line B Min intersects the declining curve vREF.

Hence, the following equation applies for the integration $$\int_{n}^{m}(b_{REF}-B_{\mathrm{Min}})\,dt;$$

'bREF' in this formula implying the rise, that means the differential quotient, of the vehicle reference speed vREF.

The integration operation between t1 and t2, is of secondary meaning for the 'spinning control'. In the circuit arrangement that will be described later on by way of FIG. 3, the same integrator solely serves to determine the start condition. The integrator will then be reset to zero at the point of time t2, so that it is allowed to fulfill its actual task described above. This integration operation for the determination of the start condition is symbolized by the course of curve i representative of the integrator contents in the time interval t1 to t2.

In the operation illustrated in FIG. 1, a situation with spinning wheels which has as a result marked rise of the reference speed vREF in excess of the actual vehicle speed vFZG is directly followed by a slip-controlled braking action. The brake was depressed 'cautiously', that means with low pedal force, at the point of time t3. Corresponding to the braking pressure rising, the wheel speed vR of that vehicle wheel will drop which is in lead of the vehicle reference speed vREF in the situation considered herein. At the point of time t5, the wheel speed vR drops below the actual vehicle speed vFZG. The wheel speed vR drops so far and so fast that brake slip control is initiated which, by virtue of keeping the braking pressure constant and/or by reducing it, brings about re-acceleration of the vehicle wheel and approximation of the wheel speed vR to the vehicle speed vFZG. This is indicated in FIG. 1 by the variation of the wheel speed vR subsequent to the point of time t5. At the point of time t5, the special control was terminated already, since the integrator contents I had become zero already before.

In the special control mode, the instantaneous wheel slip and, hence, the vehicle reference speed vREF is left out of account by the brake slip control system or, respectively, the combining logic of the control unit, after the point of time t2, because the logic gathers from the variation of the reference speed vREF that (first) there exists a wheel rotational behavior typical of a tendency to spinning (this is true starting from the point of time t1) and (second) because the start conditions are additionally complied with at the point of time t2. Consequently, after the point of time t2, the control is solely guided by the instantaneous wheel deceleration or wheel acceleration. If braking pressure control does not take place, the normal control concept having slip as well as wheel acceleration and wheel deceleration as control criteria will come to function again at the point of time t4. This is because the integrator contents becomes zero again at the point of time t4.

If, however, braking pressure control commences during the phase of spinning, that means during the wheel rotational behavior that is typical of spinning or a tendency to spinning, and after fulfillment of the start conditions, the modified control concept will apply for so long until any one wheel or a specific vehicle wheel (depending on the design of the control unit) runs stably again or reaches the stable range of the coefficient-of-friction/slip curve. If braking pressure control had commenced already prior to the point of time t4, the last-mentioned condition would have been fulfilled at the point of time t6 in the braking operation according to FIG. 1. This is because the vehicle wheel, for which the curve vR is applicable, becomes subject to an appreciable deceleration subsequent to an acceleration again, what is taken by the logic as an indication of a stable wheel rotational behavior. After t6, it is in this case again the vehicle reference vREF and, thus, the slip in combination with the wheel deceleration and acceleration that determines the braking pressure control.

Figure 2:
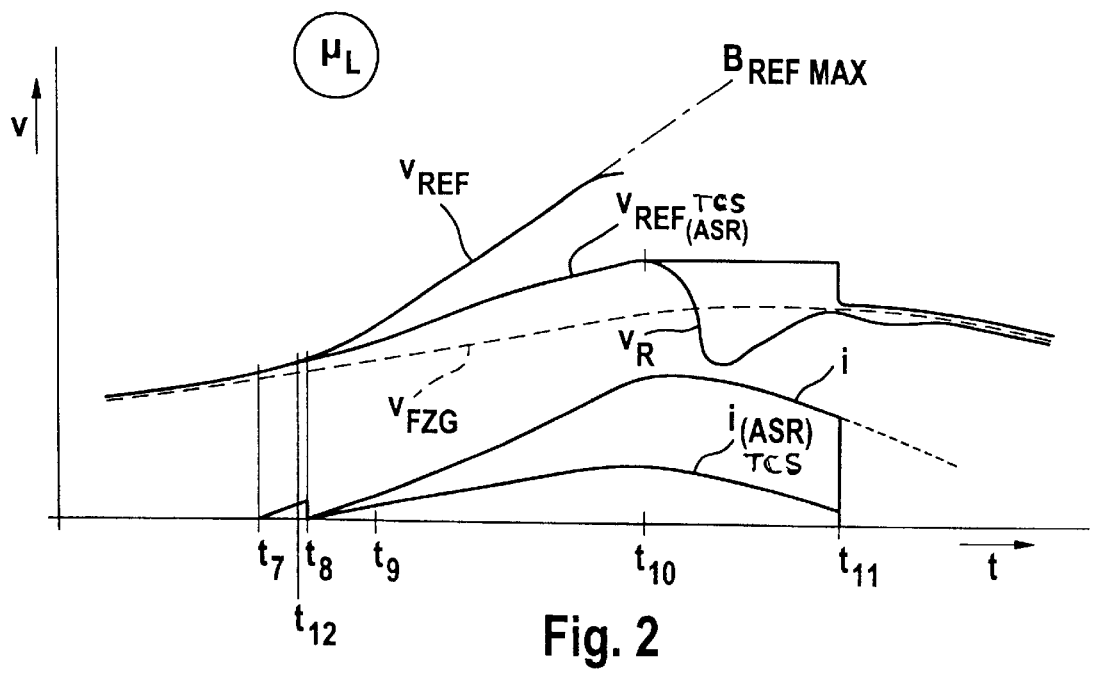
FIG. 2 is a diagram showing the time variation of the vehicle speed, the vehicle reference speed, the speed of a wheel, and the variation of a derived control quantity in the event of a braking operation on a particularly slippery roadway initiated starting from traction slip control.

FIG. 2 relates to an acceleration action and braking operation on a particularly slippery roadway with a vehicle with traction slip control, wherein the method described above is maintained and supplemented by further steps. The coefficient of friction ($\mu$L) is very low in this situation. For example, the coefficient of friction may be in the range of $\mu$=0.05 to 0.4. Entry into TCS engine control will set in at time t12 approximately. The entry into TCS engine control takes place if at leas t one wheel of the vehicle is above a variable slip control threshold that depends on conditions. Conditions may also prevail that cause the entry into TCS engine control to take place of the time t8. By way of an engine intervention, the TCS engine control effects a reduction of the engine torque and, thus, of the wheel speed vR which the vehicle reference speed vREF$_{(TCS)}$ follows. Thus, the rise of this reference speed vREF$_{(TCS)}$ does not reach the minimum value of the vehicle reference speed vREF, which would develop at time t8 without traction slip control, the said minimum value being necessary as a start condition or, if time t12 is reached after time t8, for maintaining the modified control concept. In an improvement of the method according to DE 35 21 960 A1, the spinning control reacts to a spinning tendency, that means, in all phases of spinning secured by the steps detecting, starting and maintaining, even according to a TCS signal. The TCS signal (TCS_Active) is output in the event of entry into the TCS engine control, and the special control mode is started for a braking pressure control operation that is subsequent to traction slip control and leaves the wheel slip out of account.

Situations in which approximately at time t9 a major spinning of the wheels and a rise of the vehicle reference speed vREF takes place (that almost corresponds to the predetermined straight line BREFMax which is determined by the physically maximum possible gradient) will occur only without an entry into TCS engine control. In the case with traction slip control illustrated in FIG. 2, a braking operation commences at time t10 during the phase of spinning which, however, because the road is very slippery in this case, very soon will lead to instability of a vehicle wheel and commencement of the braking pressure control. Moreover, the vehicle speed vFZG decreases only comparatively little.

The reference quantity vREF$_{TCS}$ displays that at least that wheel which is at the moment decisive for this reference quantity continues to run with positive slip. However, the reference quantity vREF$_{(TCS)}$ has been without any significance for braking pressure control since the point of time t12, at which the start condition—entry into TSC engine control—for modification of the control concept was fulfilled, so that neutralization of the braking effect in consequence of the great difference between the reference quantity vREF$_{(TCS)}$ and the vehicle speed vFZG is not allowed to occur. At the point of time t11, the wheel observed herein whose speed vR is shown in FIG. 2 displays a stable rotational behavior again. This is recognized by the electronics from the deceleration behavior of the wheel subsequent to re-acceleration. The integrator is reset at the point of time t11, and the reference speed is reduced to the value of the wheel speed at the point of time t11. The special control is thus completed. Beginning with t11, slip, wheel acceleration and deceleration apply again as control criteria. For a new entry into the spinning control and for starting of the integrator, the start conditions would have to be fulfilled again.

In the embodiment described, the wheel that is the first to run stably again is of decisive importance for the reduction of the reference quantity vREF and the resetting of the integrator. In other embodiments, the switching back to the normal control does not take place until one rear wheel or the fastest rotating rear wheel shows stable rotational behavior. In some vehicle constructions, it may be more favorable to assign the lead of the reference quantity to one front wheel. Criteria for the selection of the wheel in lead are among others the design of the differentials, differential locks and clutches in the drive trains.

The decrease of the positive slip may be initiated by actuation of the brake at the point of time t10 or by reduction of the drive force. The integrator contents is set to zero after the entry into traction slip control at a time where all wheels lie in a speed range of roughly 5 percent, preferably three percent, relative to each other for a minimum time period of 150 msec, preferably 200 msec, and the filtered wheel accelerations lie in a range of roughly 0.6 g, preferably 0.3 g, so that again the normal control concept applies for a possibly succeeding slip-controlled braking operation. The reference quantity $VREF_{(TCS)}$ and the vehicle speed again correspond to one another (approximately) at this point of time.

Figure 3:
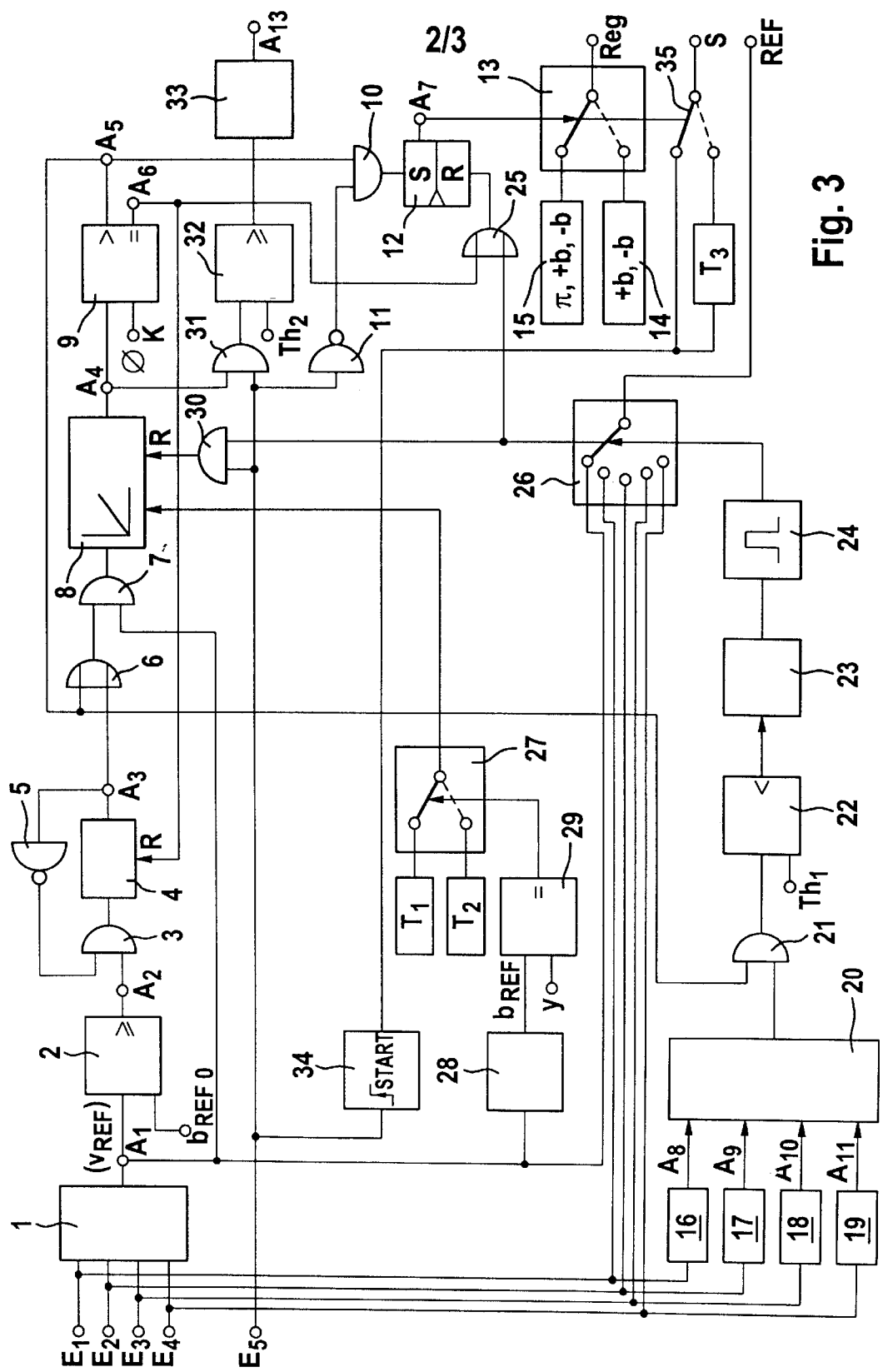
FIG. 3 is a block diagram showing the basic design of a circuit arrangement for implementing the method of the present invention.

A circuit arrangement for implementing the method of the present invention, as explained by way of FIGS. 1 and 2, is illustrated In FIG. 3.

By way of the inputs E1 to E4, electric signals that correspond to the instantaneous speed of the individual wheels vR1 (E1), vR2 (E2), vR3 (E3), and vR4 (E4) are sent to a logic circuit 1. According to a predetermined scheme or algorithm, the vehicle reference speed vREF is produced in this logic circuit 1 and sent to a comparator 2 by way of output A1.

If the gradient bREF of the vehicle reference speed vREF is equal to, or greater than, a start limit value bREF0, which amounts to e.g. 0.3 g, this condition is signaled by way of an AND-gate 3 to a digital counter 4, provided that the signal at the output A3 of this counter 4 is zero, since only in this case will the second AND-condition for the AND-gate 3 be fulfilled because of feedback by way of an inverter 5. The output signal '1' or 'H' at the output A3 of the counter 4 is maintained at first as long as the start condition monitored by the comparator 2 is prevailing. An integrator 8 whose contents is supplied to a comparator 9 by way of the output A4 is actuated by way of an OR-gate 6 and an AND-gate 7 whose second condition is satisfied by the presence of a reference signal vREF. If the comparison result is more than zero (this constant is applied to the input K of the comparator) the integration of the reference speed vREF is continued by the integrator 8 because of the signal feedback to the OR-gate 6 and the AND-gate 7.

Simultaneously, a signal from the output A5 of the comparator 9 fulfills one of the two AND-conditions of an AND-gate 10.

If the comparator 9 detects that the contents of the integrator is zero, this has as a consequence resetting (R='RESET') of the counter 4 by way of the output A6 of the comparator 9 and, thus, termination of the signal at the output A3 of this counter. Because no signal can be present at this point of time at the output A5 of the comparator 9 either, the integrator 8 will not be re-started until a signal is present at the output of the comparator 2 and the predetermined count of the counter 4 is reached. Hence, the stages 2 and 4 predefine the start conditions of the integrator.

The second AND-condition of the gate 10 is fulfilled due to the inverter 11 in the absence of a signal at the input E5. This condition prevails as long as no control cycle takes place. An edge-triggered flip-flop with a preset initial position is set by the output signal of the AND-gate 10 and switches a switch 13 over to the position illustrated in dotted lines, in which a circuit 14 is connected to the output Reg. Circuit 14 symbolizes the modified control concept applicable in the so-termed phase of spinning. As long as the circuit 14 is connected to the control terminal Reg. through the switch 13, there is performed an acceleration/deceleration control on each individual wheel without taking the instantaneous slip into account.

If, however, the switch 13 assumes the illustrated initial position, the control is predefined by the circuit 15 that takes care of the normal control in consideration of the instantaneous slip in combination with the wheel-individual acceleration and deceleration. This normal control is applicable as long as no signal is present at the output A7 of the flip-flop 12. This is the case, if the contents of the integrator 8 is zero outside of a control cycle, or if within a control cycle at least one wheel or a specific wheel shows stable rotational behavior again.

The inputs E1 to E4, at which information about the individual wheel speeds is present, are also connected with the differentiators 16 to 19. Thus, the information about the individual acceleration or deceleration of a vehicle wheel is in each case present at the outputs A8 to A11 of the differentiators 16 to 19. A logic circuit 20 takes care of finding out from the deceleration and acceleration signals of the individual wheels which wheel is running stably. It is the speed of this wheel that will then become the reference quantity vREF, as has been stated already by way of the diagrams FIG. 1 and FIG. 2.

The signal at the output of the selector 20 is combined with the output signal A5 of the comparator 9 in an AND-gate 21. Consequently, an output signal of the AND-gate 21 is present when a wheel runs stably and the integrator contents is more than zero.

A comparator 22 determines whether the individual wheel acceleration b RAD drops below the limit value prevailing at the terminal Th1 of the comparator 22. This is the case, if the wheel is subject to a specific deceleration and thereby displays stable run. If this condition is preserved for a predetermined period of time of e.g. 100 msec, what is defined by a counter 23, this results through the circuit 24 in a short-time change-over pulse which resets the flip-flop 12 by way of an OR-gate 25. Caused by this switching back that is initiated by a stably running wheel, the switch 13 will re-assume its initial position in which the circuit 15 determines the control concept.

Moreover, by way of switch 26, the speed of the stably running wheel that is determined by the selecting circuit 20 is connected to the terminal REF so that now this terminal is supplied with the speed of the stable running wheel as vehicle reference speed.

The change-over at a point of time to an integration with great time constant is accomplished in the circuit arrangement according to FIG. 3 by virtue of a switch 27 which switches over from the time constant T1 to T2 as soon as the vehicle reference speed vREF differentiated in the state 28, that is the reference acceleration bREF, becomes approximately zero or, respectively, adopts a low value within a range of ±0.2 g, for example. The limit range is predetermined by way of an input y to a comparator 29 which switches the switch 27 from the initial position illustrated to assume the dotted position as soon as the vehicle speed becomes constant, for example, or, to be more precise, falls within the range defined by the above-mentioned limits.

The time constant T1 or T2 is applied to the integrator 8 by way of the switch 27.

Furthermore, an AND-gate 30 is used to reset the integrator 8 always in that event in which any one of the wheels or a specific wheel comes into the stable range, whereupon the stage 24 outputs a pulse, and when simultaneously 'control' is signaled by way of the input E5, which means when a control cycle is being carried out at that time.

By way of another AND-gate 31, the control signal introduced by way of the input E5 is combined with the output signal of the integrator 8 and is sent to a counter 33 by way of a comparator 32.

The stages 31, 32, and 33 will start to function if, in the event of the brake slip control action not yet being completed, the contents of integrator 8 reaches or exceeds a predefined minimum value which is provided by the reference quantity Th2 at the second input of the comparator 32. In this case, the end of the control will then be brought about speedily through the counter 33, and a corresponding signal is output through the output 13. Such situations, in which brake slip control has not yet been completed and positive slip is detected nevertheless with the aid of the integrator 8, may occur in practice because the braking pressure control action lasts at least e.g. 700 msec in brake systems of the type described. Therefore, when positive slip is signaled, it is expedient that the braking action, with slip control still performing, is speedily terminated, such as by means of the counter 33 and the output signal A13.

Finally, the circuit according to FIG. 5 further comprises a signal generator 34 that is actuated on brake actuation, for example, by way of a contact of a brake light switch, and which starts braking pressure control by way of the output S. If, on brake actuation, the brake system has already been changed over to the modified control concept that was brought about by a signal at the output A7 of the flip-flop 12 and by change-over of the switch 13, likewise a switch 35 is in the position illustrated in dotted lines. In this switch position, a time constant T3 comes into effect and ensures prolongation of the braking pressure build-up at the beginning of control and thereby accelerates the transition from the phase with positive slip to the braking action.

For clarity, the two arrangements described the last, namely, the premature termination of control by way of the output A13 and the direct influence of the brake-actuating signal or, respectively, the start control were not taken into account in the diagrams of FIGS. 1 and 2.

Figure 4:
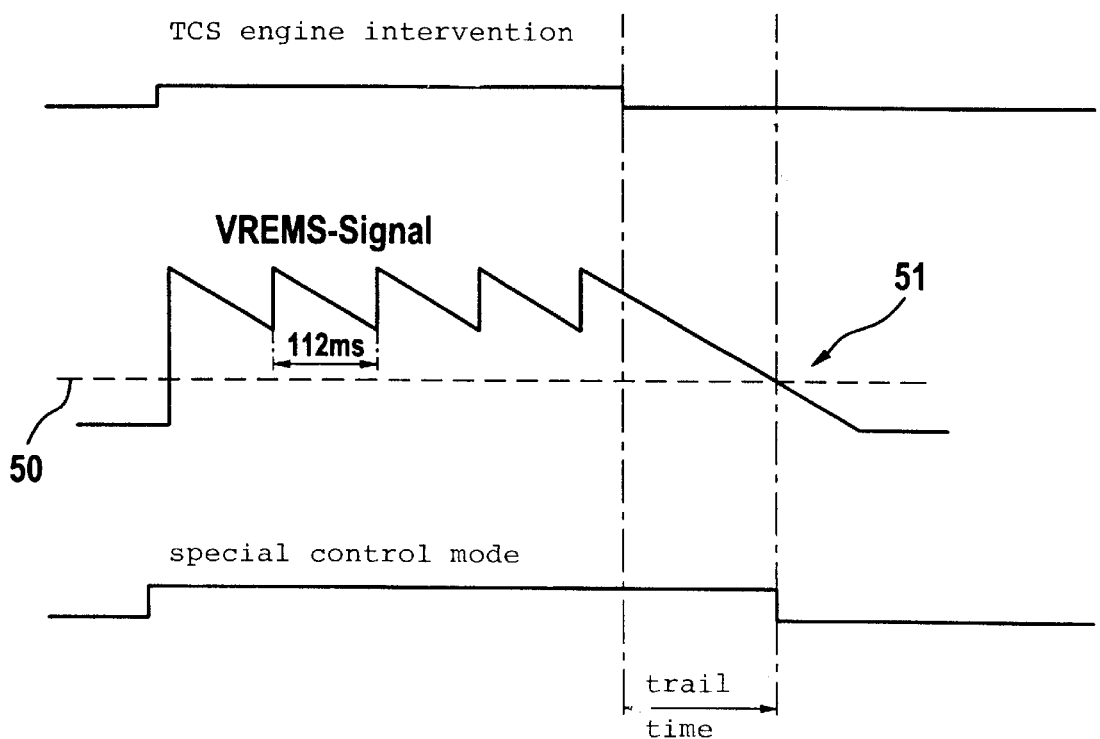
FIG. 4 is a diagram showing the time variation of the special control mode in dependence on a TCS engine intervention.

In FIG. 4, the method of the present invention during entry into the TCS engine control is illustrated. In this arrangement, the special control is triggered by way of the signal TCS_Active and maintained in each loop (time step) as long as the signal TCS_Active is set. The signal TCS_Active is set when the TCS vehicle reference speed vREF (TCS) reaches or exceeds a variable control threshold, and the TCS reference speed is produced according to other criteria than the ABS reference speed, among others, e.g. according to the engine torque.

As is shown in FIG. 4, the inverse-coupled integrator 8, which is configured as a digital counter in FIG. 3 of the circuit arrangement, is set to a fixed value (vREMS), e.g. to 10 km/h, when the TCS signal TCS_Active is generated by the TCS control. The start limit value into the TCS engine control always exceeds a variable control threshold 50 that is e.g. in a range between 1 km/h and 2 km/h. The signal TCS_Active is polled in each loop or in any other defined time interval, and the integrator 8 is incremented to the predetermined value. The magnitude of the value is so chosen that the return gradient of the value will not drop below the control threshold 50 within a time interval. It may also be fixed variably in dependence on the speed.

In a phase where no braking pressure control takes place, the switch 13 will be switched over into the normal control illustrated in FIG. 3 when the TCS control reaches or falls below an exit limit value 51. This exit limit value 51 can be identical with the control threshold 50, or it may be implemented as a separate limit value irrespective of the control threshold 50 in the control. A trail time, i.e., the time after which an entry into the normal control takes place, can be controlled by way of a variable design of the exit limit value 51. The trail time is controlled in dependence on the gradient at which backward counting is performed and/or the speed. As conditions of an exit from the second control concept in a phase of absence of braking pressure control, it is monitored in logic block 20 or the TCS control whether all wheels lie in a speed range of maximally 3% and an acceleration range of maximally ±0.3 g relative to each other for a long duration, at least 200 msec. When these conditions are satisfied and/or the integrator 8 is no longer in excess of the exit threshold, the special control mode will be left.

The conditions of exit from the special control occur in a phase where braking pressure control out of the TCS control takes place, when at least one vehicle wheel at the rear axle and/or a vehicle wheel at the front axle shows a stable rotational behavior for a predetermined minimum duration.

What is claimed is:

1. Method for controlling an anti-lock braking system, intended for motor vehicles having all-wheel drive, comprising the steps of:

generating electric signals representative of the rotational behavior of the vehicle wheels, using said electric signals for deriving braking pressure control signals, using said brake pressure control signals when a locking tendency occurs, to decrease the brake pressure or maintain a constant brake pressure for a predetermined period and then increasing the brake pressure, and wherein the wheel slip, the wheel deceleration, or the wheel acceleration are evaluated as control criteria, comparing the individual wheel speed to a vehicle reference speed which is produced by taking into account the rotational behavior of all wheels and wherein the vehicle reference speed is used as a reference quantity for controlling the braking pressure of the individual wheels, detecting wheel rotational behavior that is typical of a spinning tendency, starting a modified control mode and maintaining said modified control mode for a defined period of time wherein in said modified control concept the instantaneous wheel slip is ignored as a control criterion for said defined period of time and merely the wheel acceleration or the wheel deceleration becomes decisive for generating said braking pressure control signals, wherein the detection, or starting, or maintaining of the modified control mode is evaluated in accordance with a TCS signal.

2. Method as claimed in claim 1, wherein the modified control mode is started if a braking pressure control operation takes place in the period starting from the TCS control, until at least one vehicle wheel on the rear axle or front axle shows a stable rotational behavior for a predetermined minimum duration.

3. Method as claimed in claim 1, wherein the modified control mode is maintained until all wheels lie in a speed range and a wheel acceleration range for a predetermined duration.

4. Method as claimed in claim 3, wherein the wheel 5% relative to each other for a predetermined duration of at least 150 msec.

5. Method as claimed in claim 3, wherein the wheel accelerations lie in a range of ±0.6 g for a duration of at least 150 msec wherein 'g' refers to the acceleration due to gravity.

6. Method as claimed in claim 1, wherein the variation of the vehicle reference speed is evaluated to detect a tendency to spinning.

7. Method as claimed in claim 6, wherein the rise of the vehicle reference speed in excess of a predetermined limit value is evaluated to detect a spinning tendency, the said limit value being varied continuously or in steps in dependence on the variation of the vehicle reference speed.

8. Method as claimed in claim 1, wherein the modified control mode is started only after one or more start conditions are fulfilled in the presence of a wheel rotational behavior that is typical of a spinning tendency.

9. Method as claimed in claim 8, wherein a rise of the vehicle reference speed in excess of a predetermined limit value and continuation of this tendency during a predetermined minimum time and an entry into a TCS engine control are chosen as start conditions.

10. Method as claimed in claim 8, wherein an entry into a TCS engine control is chosen as a start condition.

11. Method as claimed in claim 9, wherein a start limit value of an ABS vehicle reference speed is predefined in the range between 0.1 g and 0.5 g.

12. Method as claimed in claim 9, wherein a start minimum time is predetermined in the range between 40 and 200 msec.

13. Method as claimed in claim 2, wherein after at least one wheel re-enters into a stable rotational behavior, said at least one wheel will take over the lead in the vehicle reference speed.

14. Method as claimed in claim 2, wherein after the modified control mode has begun, the braking pressure reduction is delayed by a predetermined period that is a function of the wheel rotational behavior.

15. Method as claimed in claim 14, wherein depending on the wheel rotational behavior, braking pressure reduction is delayed, and with a low wheel deceleration, a shorter delay time, and with a high wheel deceleration a longer delay time, is chosen.

16. Method as claimed in claim 1, further including immediately entering into the modified control mode when a wheel rotational behavior typical of spinning is detected and the vehicle reference speed rises directly following a controlled braking operation.

17. Circuit arrangement for controlling an anti-lock brake system for motor vehicles, comprising:

sensors for generating electric signals representative of the rotational behavior of the vehicle wheels, circuits for conditioning, processing, and logically combining the sensor signals and for generating braking pressure control signals in dependence on the slip and the deceleration or acceleration of the individual wheels, circuits for producing a vehicle reference speed in dependence on the rotational behavior of the wheels and for comparing the instantaneous speed of the individual vehicle wheels with the vehicle reference speed, and switching means for influencing the control in the event of tendencies to spinning, wherein for detecting a spinning tendency, the rise of the vehicle reference speed (vREF) in excess of a predetermined limit value is evaluated, change-over means for entering into a modified control mode when a tendency to spin is detected and when predetermined start conditions are reached which are satisfied at least when a limit value of the vehicle reference speed is reached, and this tendency continues to last during a predetermined time period, means for maintaining said modified control mode until predetermined exit conditions occur, means for detecting, or starting, or maintaining the modified control mode according to a TCS signal.

18. Circuit arrangement as claimed in claim 17, wherein the conditions of exit from the modified control mode in a phase where a braking pressure control takes place out of the TCS control are satisfied when at least one vehicle wheel at the rear axle and/or one vehicle wheel at the front axle shows a stable rotational behavior for a predetermined minimum duration.

19. Circuit arrangement as claimed in claim 17, wherein the conditions of exit from the modified control concept in a phase of absence of braking pressure control are satisfied when all wheels lie in a 5% speed range for at least 150 msec, or an acceleration range of ±0.6 g or less.

20. Circuit arrangement as claimed in claim 17, wherein the variation of the control concept takes place after a TCS engine control.

21. Circuit arrangement as claimed in claim 20, wherein the start limit value into the TCS engine control lies in a range between 1 km/h and 2 km/h.

22. Circuit arrangement as claimed in claim 20, further including a digital counter that serves as an inverse-coupled integrator and, as soon as the start conditions are satisfied, said digital counter is set into operation and integrates the rise of the vehicle reference speed with a predetermined time constant, or is set to a fixed value.

23. Control arrangement as claimed in claim 22, wherein the event of an exit from the TCS control in a phase of absence of braking pressure control, the conditions of an exit from the modified second control concept are satisfied when the TCS control reaches or falls below an exit limit value.

* * * * *